Jan. 5, 1971  J. BADOZ ET AL  3,552,823
POLARIZER
Filed Aug. 8, 1966

3,552,823
POLARIZER

Jacques Badoz, Bagneux, Michel Billardon, Chilly-Mazarin, Jean Virloget, Le Mesnil-Saint-Denis, and Marcel Debrie, Sevres, France, assignors to Centre National de la Recherche Scientifique, Paris, and Societe Francaise d'Instruments de Controle et d'Analyses, Le Mesnil-Saint-Denis, Yvelines, France
Filed Aug. 8, 1966, Ser. No. 570,842
Claims priority, application France, Aug. 16, 1965, 28,011
Int. Cl. G02f *1/24;* G02b *5/04*
U.S. Cl. 350—157          9 Claims

ABSTRACT OF THE DISCLOSURE

A polarizer comprises two prisms mounted in a sleeve having windows at opposite ends and filled with liquid. The prisms have different ordinary and extraordinary indices of refraction while the liquid has a single index lower than the indices of the prisms. The liquid serves the dual function of protecting the prisms and of cooperating with the prisms to effect the emission of one polarized beam and the total reflection of the other.

---

This invention relates to polarizers.

Total-reflection and normal-field prisms such as the Glazebrook or Glan-Thomson prisms are already known. These polarizers consist of a pair of prisms of naturally double-refraction material (calcite) mounted head to tail and cemented by means of Canada balsam or linseed oil. The optical axis of this double-refraction material is parallel to the input and output faces of the polarizer. As a consequence of the light absorption caused by the cement layer these prisms are unsuitable for wavelengths less than 3,000 A. To avoid this drawback, glycerin was proposed for gluing the prisms. However, in this case, in addition to the inconveniences specific of the use of glycerin, which is a hygroscopic liquid, the operation at low wavelength values is limited by the absorption of light by calcite. Under the best circumstances, wavelengths of less than 2,300 A. cannot be used.

It is a specific object of the present invention to avoid the inconveniences characterizing polarizers of the types set forth hereinabove by providing, as a novel industrial product, a total-reflection and normal-field polarizer characterized by an assembly consisting of two identical prisms of synthetic, single-axis double-refraction, suitably cut material, wherein the optical axis is parallel to the input and output faces of the polarizer, adapted to be operated with wavelengths of less than 1,850 A. This pair of prisms are immersed in an isotropic liquid which is also transparent at these wavelength values, and having an index $n$ lower than the ordinary index $n_o$ and also than the extraordinary index $n_e$ of the selected double-refraction material.

The values of the ordinary index $n_o$ and the extraordinary index $n_e$ of the crystal material of the prisms are linked to the direction of polarization of the beam of light with reference to the optical axis of the crystal, that is to say the "extraordinary" beam is propagated in the crystal according to the index $n_e$ while the "ordinary" beam is propagated in the crystal according to the index $n_o$.

The liquid which forms an intermediate layer between the two prisms has the same index for the "ordinary" beam and the "extraordinary" beam. The relative index of the liquid with reference to the crystal is thus different for the two beams and moreover is less than 1 in order to obtain two limited angles of refraction. Thus, if there is directed on the liquid layer a beam of which the angle of incidence is comprised between the two limited angles, one of the beams is totally transmitted and the other is reflected.

The liquid thus has a two-fold role in the polarizer:

(a) By providing two relative indices of refractions which are different for the two beams, it cooperates with the prisms to emit one of the polarized beams while ensuring the total reflection of the other. The reflected beam is either absorbed by a lateral face of the polarizer or transmitted to the outside by an accessory device.

(b) As the liquid between the prisms is the same as that in which the prisms are immersed, it protects the double-refraction material from contact with the air and permits coarser polishing of the material.

According to a specific feature characterizing this invention, the two prisms are made from mono-ammonium phosphate, the optical axis of the double-refraction substance being parallel to the input face of the prism.

According to another feature, the angular field $\beta$ extends substantially symmetrically about the normal to the input face of the polarizer.

This invention will be better understood if reference is made to the attached drawing in which.

The polarizer according to this invention consists as conventional of a pair of prisms 2 and 3 (FIG. 1) of double-refraction single-axis material such as mono-ammonium phosphate. According to this invention, these two prisms are immersed in an isotropic substance having an index $n$ lower than the ordinary index $n_o$ and extraordinary index $n_e$ of the double-refraction material constituting these prisms 2 and 3.

The optical axis of each prism 2, 3 lies in a plane ABCD or A'B'C'D' and is parallel to the direction AD.

Figure 1:
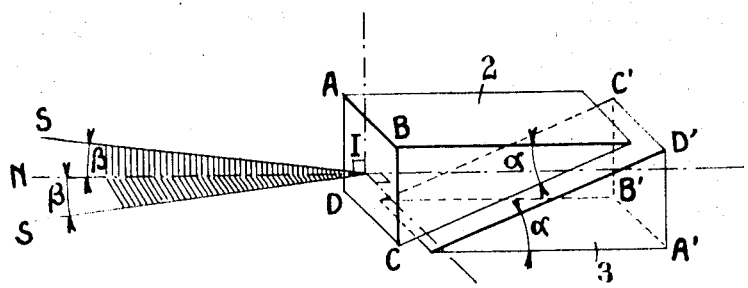
FIG. 1 is a perspective diagrammatic view of the pair of prisms, showing notably the angular field of the incident ray with the field extending symmetrically about the normal to the input face.

The angle $\alpha$ at which these prisms are cut depends on the specific incidences of the prism materials and is so selected that one of the polarized beams is totally reflected while the other is emitted for an angular field $\beta$ extending substantially symmetrically about the normal NI, which field is dependent on the maximum angle formed by the incident rays SI with the normal NI to the input face ABCD (FIG. 1).

The numerical characteristics of a typical example of this polarizer are given hereinafter:

Prism material: mono-ammonium phosphate having the following indices for the sodium ray $D$: $n_o=1.525$ and $n_e=1.479$.
Optical axis parallel to AD.
$\alpha=18°6'$.
$AC'=42$ mm.; $CD=17$ mm.; $BC=16$ mm.
Immersion substance: cyclohexane with a theoretical number $n=1.4266$ (less than the above indices $n_o=1.525$ and $n_e=1.479$).

This prism set gives remarkable results. In fact, a practically symmetric field is obtained in air $\geqslant 4°$ on either side of the normal. On the other hand, the ratio of the polarized intensity to the unpolarized intensity, measured in comparison with a conventional spar prism is of the order of $10^6$. Finally, the maximum emission is obtained in the visible radiation spectrum and the distant ultraviolet spectrum.

Figure 2:
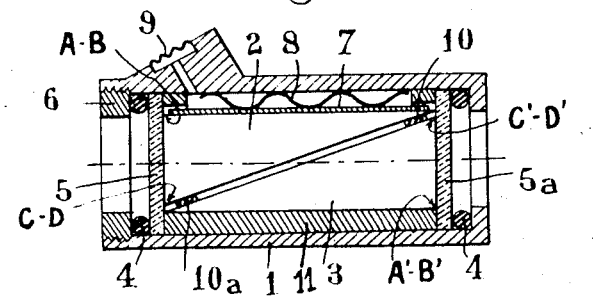
FIG. 2 is a longitudinal section showing a typical form of embodiment of the polarizer.

FIG. 2 illustrates a typical form of embodiment of the polarizer according to this invention.

A metal body 1 having a suitable coefficient of thermal expansion contains the two identical prisms 2 and 3 disposed head to tail. Two windows 5 and 5a of molten silica, perfectly annealed and having the maximum planarity and parallelism, constitute the ends of the mounting and contact the faces ABCD and A′B′C′D′ of the two prisms.

A pair of O-rings 4 of fluorine-containing elastomer capable of resisting without swelling to the chemical action of cyclohexane provide a perfect seal to the assembly while exerting a minimum pressure against the windows 5, thus avoiding any double-refraction by compression.

An extremely flexible resilient member 8 urges the two prisms against each other through the medium of a plate 7 adapted uniformly to distribute this light pressure throughout the surface ABC′D′ of the prism.

An intermediate sleeve 11 having optically polished end faces ensures a perfect parallelism between the two windows 5 and 5a, thus protecting the polarizer against any longitudinal compression.

In addition, a pair of extremely thin shims (for example of a thickness of the order of .0005″) are disposed between the two prisms to provide a constant and permanent thickness of the cyclohexane layer filling the device and also the corresponding gap between the two prisms 2 and 3.

The above-described assembly is filled with cyclohexane of which the changes in volume by temperature variations are compensated by a flexible membrane 9 provided on the top of the polarizer.

Figure 3:
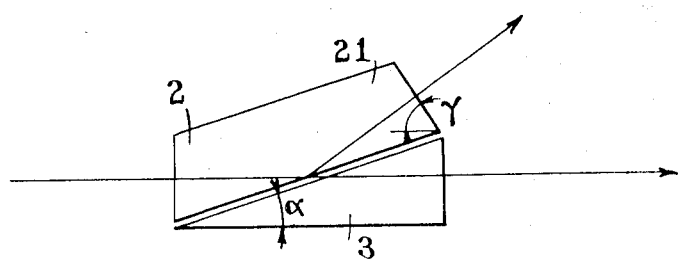
FIG. 3 is a diagram showing another possible form of embodiment of the invention.

According to an alternate form of embodiment of this invention which is illustrated diagrammatically in FIG. 3, a complementary prism 21 is either cut integrally with or added to, the prism 2 in order to permit the emission of the reflected polarized rays, in contrast to the form of embodiment illustrated in FIGS. 1 and 2, which ensures the elimination of one of the polarized beam by total reflection in the prism 2. In this specific form of embodiment the angle $\gamma$ of prism 21 meets the following requirement:

$$\gamma = \frac{\pi}{2} - 2\gamma$$

If the complementary prism 21 is a separate prism cemented to the main prism 2, its index approximates that of said prism 2.

The present invention is characterized by many advantageous features in comparison with known polarizers notably:

An easy separation of the polarized beams;
The possibility of scanning the distant ultra-violet;
Practically symmetrical field.

The prisms may be made from any other suitable materials having their indices close to those of mono-ammonium phosphate, such as KDP or magnesium fluoride.

The immersion substance may consist of ordinary hexane or a silicone oil.

This invention is also concerned, by way of novel industrial products, with the apparatus, instruments and devices equipped with the polarizer of this invention, such as photogoniodiffusometers, interferometers or any other apparatus utilizing polarized light.

What we claim is:

1. A polarizer comprising a sleeve having end walls with openings therein, two opposite parallel windows located inwardly of said end walls and closing said sleeve, gaskets mounted between said windows and said end walls to provide a seal, two identical prisms of single-axis double-refraction material in said sleeve and between said windows, each of said prisms comprising a first face containing the optical axis of said double-refraction material and a second face inclined at an acute angle to said first face, said first faces of said prisms being adjacent and parallel to said windows respectively and said second faces being parallel to one another and spaced apart, said material being transparent to radiation having a wave length of less than 1850 A. and an isotropic liquid in said sleeve immersing said prisms and filling the space between said second faces, said liquid being transparent to radiation having a wavelength of less than 1850 A. and having an index lower than both the ordinary and extraordinary indices of said double-refraction material of said prisms, said liquid having the dual function of protecting said prisms against corrosion and tolerating coarser polishing of the faces of said prisims, and of cooperating with said prisms to effect the emission of one polarized beam and the total reflection of the other.

2. A polarizer according to claim 1, wherein said prisms are of mono-ammonium phosphate.

3. A polarizer according to claim 2, wherein said isotropic liquid is cyclohexane.

4. A polarizer according to claim 1, wherein the angle of said inclined faces of said prisms is selected to effect the emission of said one polarized beam in a narrow angular field which is substantially symmetrical with respect to a normal to said first faces of said prisms.

5. A polarizer according to claim 4, wherein said inclined face of each said prism is at an angle of the order of 18° 6′ to a normal to said first face.

6. A polarizer according to claim 1, comprising a spacer between said inclined faces of said prisms and means for resiliently pressing said prisms toward one another to maintain them in spaced relation determined by said spacer.

7. A polarizer according to claim 1, comprising an intermediate sleeve between said windows and having perpendicular ends engaged by said windows to assure perfect parallelism of said windows and protect the polarizer against longitudinal compression.

8. A polarizer according to claim 1, wherein said sleeve comprises flexible diaphragm means for compensating volumetric variations of the isotropic liquid caused by temperature variations.

9. A polarizer according to claim 1, comprising an additional prism so disposed as to permit the emission of the reflected polarized beam.

References Cited

UNITED STATES PATENTS

| 3,075,869 | 1/1963 | Yamaguti | 350—157 |
| 3,433,553 | 3/1969 | Peters | 350—157 |
| 2,274,110 | 2/1942 | Ward | 350—157X |
| 2,550,962 | 5/1951 | Brandon | 350—287 |
| 2,607,272 | 8/1952 | Bond | 350—157 |

FOREIGN PATENTS

| 371,579 | 5/1939 | Italy | 350—179 |
| 360,807 | 5/1906 | France | 350—157 |
| 18,919 | 12/1892 | Great Britian | 350—179 |

OTHER REFERENCES

Buhrer et al. Applied Optics, Vol. 3, No. 12, December 1964, "The Pockels Effect of Hexamethylenetetramine."

Vorlander, Faraday Society London Transaction, Vol. 29.2, 1933, pp. 907–910, "Remarks on Liquocrystalline Resins and Laquers."

PAUL R. GILLIAM, Primary Examiner

U.S. Cl. X.R.

350—286